(12) United States Patent
Moulsley

(10) Patent No.: US 6,185,257 B1
(45) Date of Patent: Feb. 6, 2001

(54) METHOD FOR SIMPLIFYING THE DEMODULATION IN MULTIPLE CARRIER TRANSMISSION SYSTEM

(75) Inventor: Timothy J. Moulsley, Caterham (GB)

(73) Assignee: U.S. Philips Corporation, New York, NY (US)

( * ) Notice: Under 35 U.S.C. 154(b), the term of this patent shall be extended for 0 days.

(21) Appl. No.: 09/029,529

(22) PCT Filed: Jun. 25, 1997

(86) PCT No.: PCT/IB97/00784
§ 371 Date: Feb. 27, 1998
§ 102(e) Date: Feb. 27, 1998

(87) PCT Pub. No.: WO98/00953
PCT Pub. Date: Jan. 8, 1998

(30) Foreign Application Priority Data

Jun. 28, 1996 (EP) .................................................. 96110469

(51) Int. Cl.[7] ........................................................ H04K 1/10
(52) U.S. Cl. ............................................. 375/260; 370/259
(58) Field of Search .................................... 375/259, 260, 375/268, 261, 355, 350, 331, 332; 370/480, 206, 210, 484

(56) References Cited

U.S. PATENT DOCUMENTS

| 5,596,604 | * | 1/1997 | Cioffi et al. | ........................... 375/260 |
| 5,636,246 | * | 6/1997 | Tzannes et al. | ...................... 375/260 |
| 5,715,280 | * | 2/1998 | Sandberg et al. | .................... 375/260 |
| 6,097,762 | * | 8/2000 | Suzuki et al. | ......................... 375/259 |

* cited by examiner

Primary Examiner—Wellington Chin
Assistant Examiner—Brenda H. Pham
(74) Attorney, Agent, or Firm—Dicran Halajian

(57) ABSTRACT

A transmission system for the transmission of a signal having a number of carriers provides a simplified demodulation function. The simplification is achieved by reducing the quantity of arithmetic operations that are required, particularly when only one or a few channels have to be received and demodulated.

2 Claims, 3 Drawing Sheets

METHOD FOR SIMPLIFYING THE DEMODULATION IN MULTIPLE CARRIER TRANSMISSION SYSTEM

BACKGROUND OF THE INVENTION

The present invention relates to multiple carrier transmission systems.

Multicarrier Modulation, hereinafter denoted as MCM, is also known as Orthogonal Frequency Division Multiplexing, hereinafter denoted as OFDM, or Discrete Multitone Modulation, hereinafter denoted as DMT. It is a technique by which data is transmitted at a high rate by modulating several low bit rate carriers in parallel rather than one single high bit rate carrier. This technique is in principle known from the article of J. J. Nicolas and J. S. Lim, "On The Performance Of Multicarrier Modulation In A Broadcast Multiplath Environment," IEEE ICASSP, Vol. 3, pp 245–248, 1994, hereinafter denoted as "reference 1", and from J. P. Linnartz, S. Hara, "Special Issue On 'Multi-Carrier Modulation'," published via internet address http://diva.eecs.berkeley.edu/~linnartz/issue.html, hereinafter denoted as "reference 2". It has been shown to be effective for high performance digital radio links and is considered in this report for use with a mobile radio channel.

Fading is often encountered in mobile radio channels where the signal to noise ratio, hereinafter denoted as SNR, across part of the frequency band decreases dramatically for a short period of time. Using a single carrier system a very low error rate can occur between these fades but a very high rate occurs during the fade. This gives an overall error rate which is often unacceptable. MCM deals with these fading characteristics more effectively.

With single carrier modulation an equalizer can be required to reduce the effects of time dispersion. Introducing this means increased noise and gives a transmitter power penalty or increases the systems vulnerability to interference, see reference 2. Since coded MCM has longer symbol intervals than single carrier modulation there is no requirement for an equalizer as known from R. Petrovic, W. Roehr, D. W. Cameron, "Multicarrier Modulation For Narrowband PCS", IEEE Trans. on Veh. Tech., Vol. 43, Iss. 4, pp 856–862, November 1994, hereinafter denoted as "reference 3", and in some cases some time dispersion has been found to actually improve the bit error rate performance of the system, see reference 2. This has been explained by Linnartz due to the reduction of correlation of fading between the carriers because of the diversity present. Only a limited number of subcarriers are subjected to fading at a time and forward error correction coding can deal with the errors on these subcarriers.

Another advantage of MCM is that it is more robust against impulse noise in the time domain as described in the article of T. N. Zogakis, P. S. Chow, J. T. Aslanis and J. M. Cioffi, "Impulse Noise Mitigation Strategies for Multicarrier Modulation", IEEE Int. Conf. on Comms., Vol. 2, pp 784–788, 1993, hereinafter denoted as "reference 4", and has more immunity to fast fades as to be seen from reference 3. An MCM signal can also be tailor made to account for the channels characteristics. For example it can be made to remove certain carriers, thereby avoiding narrowband interference at known frequencies, see reference 1.

OFDM is a form of multicarrier modulation where the subchannel carriers are orthogonal to each other so allowing the use of Fast Fourier Transformation techniques, hereinafter denoted as FFT, and of Inverse Fast Fourier Transformation techniques, hereinafter denoted as IFFT, for the receiver and transmitter functions, eliminating the need for a bank of mixers. A major use of OFDM is in digital audio broadcasting, hereinafter denoted as DAB. Since MCM is robust against multipath fading it will also produce reasonable results if the signals are transmitted from two different transmitter sites where the interference between the two is like that of multipath propagation. This results in efficient use of the radio spectrum which is a major advantage when there is little spectrum available.

MCM can be used for the transmission of low rate video and it has been proposed that it can be used for Digital Video Broadcasting to ensure that mobile signals are reliably received from digital Terrestrial Television broadcasting, see reference 2.

Since OFDM uses a large number of carriers, each of which is modulated by a data signal, and therefore the bit rate associated with each carrier can be made relatively low, the effects of inter-symbol interference due to multipath propagation can be minimised. Conventionally the multicarrier transmission is generated and demodulated using IFFT and FFT algorithms respectively. This can be computationally expensive, particularly since typical systems can use several megahertz of bandwidth, and the whole of this bandwidth must be sampled and processed.

This proposal is aimed at those applications where it is required to receive (or generate) only a subset of the total number of carriers. This is appropriate where several data signals are multiplexed onto a single broadband transmission. For example, in audio broadcasting it may be desired to receive only one of several audio channels, each of which has been allocated to a number of the available carrier frequencies. In a mobile radio application, a base station may be transmitting data to several users, and the traffic for each user will be partitioned among the available carriers. On the other hand each user will only wish to demodulate their own data signals. In the mobile radio example, the return transmission from each user to the base station may only need a small number of the available carriers.

An advantage of OFDM is that it can provide some degree of frequency diversity in a frequency selective fading environment. This diversity is achieved because although at any given moment some of carriers may be experiencing fading, the others will not. Channel coding can then be applied to correct the transmission errors from the fading carriers, giving Coded OFDM, hereinafter denoted as COFDM. In general, the benefit of frequency diversity is maximised if the carriers used for a particular data channel are spread as far apart as possible in the frequency domain. One convenient way of achieving this is to partition the available carriers into sets of uniformly spaced so called combs, where each data channel is allocated to the carriers of a particular comb. The combs for each channel (or user) are then interleaved in frequency.

Example System

The following example is intended to illustrate the principle. Though in practice other features may also be necessary, it is obvious to a person skilled in the art that this example does not restrict the scope of the present invention to be described later-on in this specification.

For the example a system is considered which transmits 1024 carriers, each of which is modulated e.g. by DPSK at a rate of lkbps. The symbol duration is therefore 1 ms. The carrier spacing can be 1 kHz, which gives a total bandwidth of about 1 MHz. On the premises that e.g. 8 carriers are assigned to a single data channel which for instance has a bit rate of 8 kbps, then a total of 128 channels can be supported. For maximum frequency diversity gain, the carrier spacing for the "comb" of one data channel is then 128 kHz.

It is assumed that in the transmitter there is some means for conversion between a baseband representation of the multicarrier signal and an RF version. It is also assumed that the receiver has means for converting the RF signal to a baseband version, and some means of obtaining frequency and time synchronisation to allow correct demodulation of the data. At the receiver the signal may well be represented by I (in-phase) and Q (quadrature) components. Well known techniques exist for these processes.

In this description effects due to propagation over a non-ideal radio channel will not be considered.

To generate all the carriers would require a 1024 point IFFT to be computed every 1 ms. Similarly to demodulate all the carriers would require a 1024 FFT every 1 ms (as well as other processing). Suitable FFT algorithms can be implemented with available digital signal processing techniques, hereinafter denoted as DSP.

For the given example system the number of arithmetic operations required can be estimated. The basic FFT requires of the order of $Nlog_2N$ operations, where N is the FFT size. Since these operations are on complex numbers the quantity of operations must be multiplied by some factor (about 4 is reasonable) to convert to real floating point operations as commonly used in measuring the complexity of DSP algorithms. Thus for N=1024, the number of operations in 1 ms is 4*1024*10=40960, which is equivalent to about 41 MOPS (Million Operations Per Second). For comparison, in the literature an efficient implementation of a split radix FFT of 1024 points is quoted as requiring 34774 non-trivial operations, equivalent to about 35 MOPS.

SUMMARY OF THE INVENTION

As becomes clear from the foregoing, the described demodulation method and therefore a transmission system performing the same must be able to deal with a very large number of arithmetic operations within a very short time. Such a system will be very complicated and expensive.

It is therefore an object of the present invention to provide a transmission system in which the quantity of arithmetic operations can be significantly reduced, especially in the case that from the total number of channels only one or a few channels have to be received and demodulated.

A transmission system solving the problem which is the basis of said object of the present invention is defined by the characteristics of the main claim.

Furthermore, a receiver stage to be used with the transmission system according to the present invention is given by the characteristics of claim 2.

It is an advantage of the present invention that the complexity of demodulation for a single data channel can be substantially reduced, compared with other arrangements. This advantage is only subject to the constraint of uniformly spaced carriers for a single data channel.

A signal which consists of a harmonically related set of signal components is in general periodic with a period equal to the reciprocal of the minimum frequency separation between each component. Therefore in the example system mentioned in the aforesaid a symbol period of 1 ms is considered. In this each of the carriers present can be represented by a sinusoid with a phase determined by the modulating data. If it is ensured that the base-band representation is such that one of the carriers of the desired data channel is positioned at zero frequency, then the other carriers from the same data channel will form a harmonically related set. This condition can be achieved by appropriate choice of local oscillator frequency for down-conversion from RF.

For the example system, the carriers from the wanted data channel form a periodic signal with period of 1/128000, which repeats 128 times within the symbol time of 1 ms. The wanted carriers can then be recovered by adding together each of these repeating periods.

So if the following parameters are given as:

| | | |
|---|---|---|
| Receiver sampling frequency | $f_s$ | 1024000 Hz, |
| Symbol rate on a single carrier | $f_{sym}$ | 1000 Hz, |
| Carrier separation (single user) | $f_{sep}$ | 128000 Hz, | then the input samples S(t) are processed in the following way:

$$X(t) = \sum_{n=1}^{n=N_r} S\left(t + n \cdot \frac{f_s}{f_{sep}}\right)$$

with
 t being an integer of a value running from t=1 to $t=f_s/f_{sep}$,
 n being an integer of a value running from n=1 to $n=N_r$
 and
 $N_r$ being defined as $N_r=f_{sep}/f_{sym}$,
where
 X(t) is the output signal as obtained by said processing.
 In the aforesaid example system values for these parameters are given as
 $f_s/f_{sep}=8$ and $N_r=128$.

This process can be considered as a special purpose decimation filter.

The number of real arithmetic operations required to compute the equation giving X(t) is calculated resp. roughly estimated as being $N_r*(f_s/f_{sep})*2=8*128*2=2048$,
where a factor of two is included because the data is complex. This could be followed by an 8-point FFT requiring about $4*8 \log_2(8)=4*24=96$ real operations. The total is therefore 2144 in a symbol period of 1 ms. Therefore the required processing rate to compute the phase of each of the desired carriers (in the form of a set of complex numbers) is 2.1 MOPS. This is a considerable saving compared with demodulation of all the received carriers.

The same approach can be applied to systems with different numbers of carriers.

The number of carriers allocated to one channel may be different. This could also be dynamic depending on the required data rate.

Additional processing would be required for carrier and timing acquisition. This may be possible by extension of the demodulation process described here. Alternatively it could be aided by transmission of special information on some of the carriers, for example unmodulated tones on some carriers and special data sequences on others.

The input data to the receiver will probably be sampled by some form of analog-to-digital-converter. In general this may not need to have a high degree of accuracy (e.g. a few bits or perhaps one single bit). This is because the use of the above-mentioned equation will tend to reduce any effects due to quantisation noise.

A similar approach can be applied to modulation, where it is required to generate a regularly spaced "comb" of carriers over a wide frequency range. The fundamental period of the waveform can be generated via an IFFT. This period is then repeated for the required symbol duration. The number of repetitions determines the frequency spacing between carriers.

The demodulation (or modulation) method given by the present invention can be easily implemented using conventional programmable DSP techniques. Simulations have shown that good performance can be obtained for data rates and radio channels appropriate for mobile radio communication systems.

DESCRIPTION OF PREFERRED EMBODIMENTS

Figure 1:
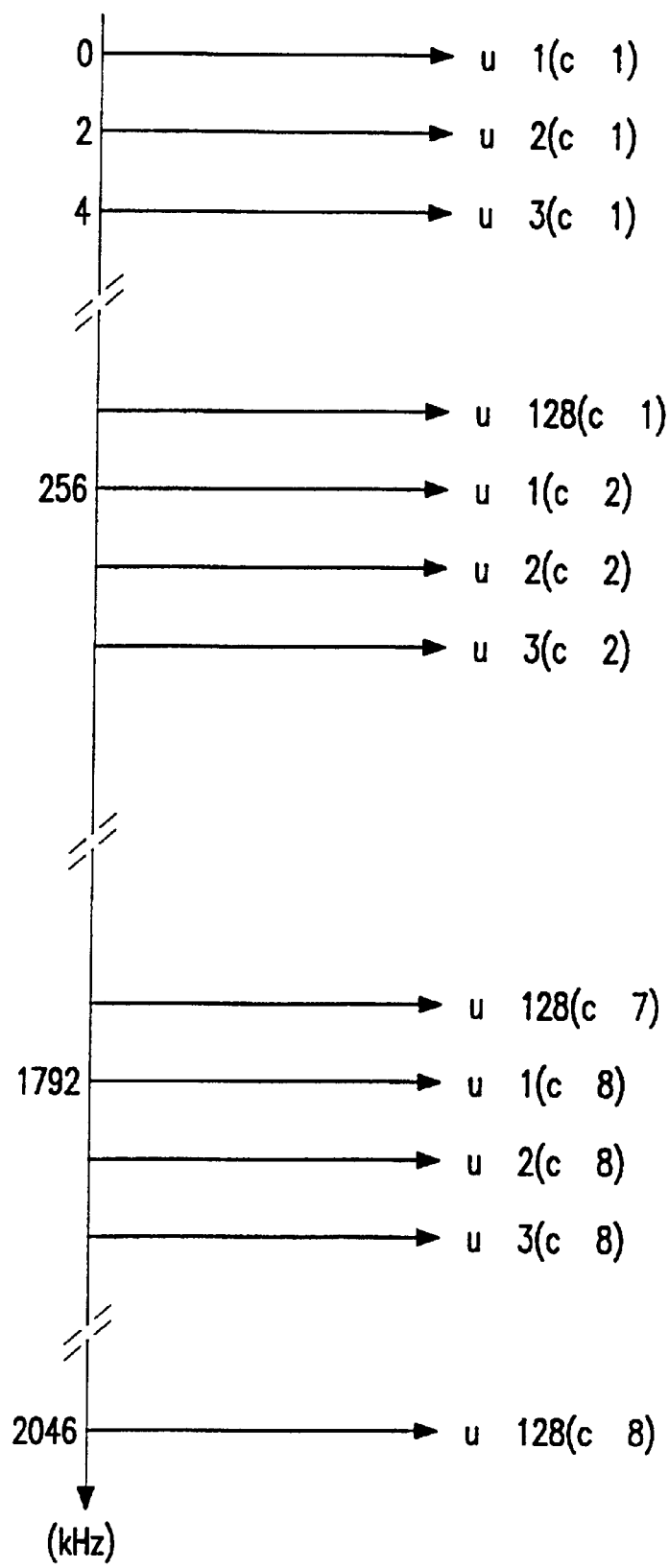
FIG. 1 is a diagram showing schematically the carrier spacing of a system with 128 users resp. channels and 8 carriers per user.

In FIG. 1 a set of carriers is plotted over the baseband frequency beginning with zero. The carrier spacing shown comprises the carriers as explained together with the "example system" and the invention. There are 128 users resp. channels in the transmission system, the information data of each channel spread over 8 carriers each. The spacing between two carriers being adjacent to each other on the frequency axis in this embodiment is given as 2 kHz, the total number of carriers is 1024, such the carriers are spread over a bandwidth of in total 2048 kHz. The carriers are arranged in the form of a "comb" comprising all the carriers related to one single channel resp. user, consequently each "comb" has eight "teeth", the "teeth" being the carrier frequencies. The spacing between the carriers related to one of the users therefore is 128 kHz. So, the carriers c1 to c8 related to user u1 are placed on the frequency axis at 0, 256, 512, ..., 1792 kHz, the carriers c1 to c8 related to user u2 are placed at 2, 258, 514, ..., 1794 kHz, etc., and the carriers c1 to c8 related to user u128 are placed at 254, 510, 766, ..., 1790, 2046 kHz. Thus, a maximum spacing between the carriers related to the same user is achieved.

Figure 2:
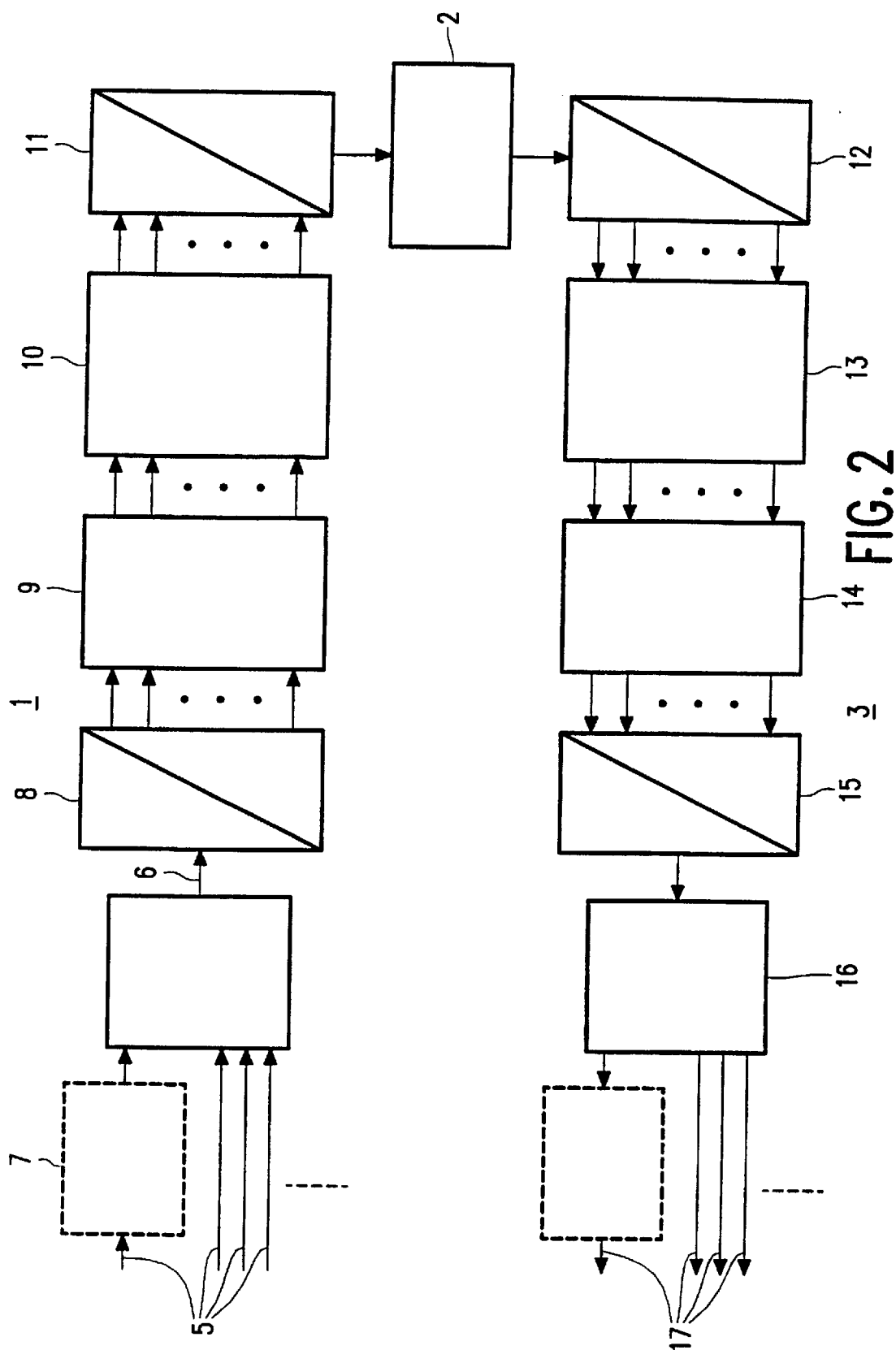
FIG. 2 is a schematic block diagram of an example for a MCM transmission system to which the invention can be related.

FIG. 2 shows a block diagram of a MCM transmission system with a transmitter stage 1 at the top, a channel for the transmission of the signals prepared by the transmitter stage 1, hereinafter more precisely denoted as transmission line 2 (which will be, in fact, a wireless broadcasting connection), and a receiver stage 3 at the bottom of the drawing. The transmitter stage 1 comprises a merging means 4 for merging the signals of a number of users resp channels which number may be 128 in accordance with the example system described above. These merging means 4 combine input signals from the users being inputted in parallel on lines 5 to obtain a merged input signal including the information from all users at its output 6. Before being inputted to merging means 4 the information signals from the users optionally can be coded in a coding stage 7. This coding can be desirable to correct noise. There are a variety of coding methods for obtaining noise suppression known to those skilled in the art. However, the application of such a method is not the aim of the present invention and will therefore not be discussed here.

From the output 6 the merged signal is inputted in serial form to a first serial-to-parallel-converter 8 where it is split up into a number of parallel signal channels according to the number of carriers used in the transmission system. These parallel signal channels are fed into a modulator stage 9 wherein the carriers shown in FIG. 1 are modulated by the parallel signal channels by way of DPSK. The modulated carriers are then fed into an IFFT means 10. This is a stage in which the modulated carriers are transformed in the way of Inverse Fast Fourier Transformation. The modulated carriers transformed in that manner are then fed into a first parallel-to-serial-converter 11 to give a single serial signal to be transmitted across the transmission line 2.

In the receiver stage 3 the signals transmitted across transmission line 2 are fed into a second serial-to-parallel-converter 12, in which they are split up into parallel signals for the single carriers each. These parallel signals are fed into a FFT means 13 transforming the signals inputted by Fast Fourier Transformation and outputting them to a demodulator stage 14 in which the modulated carriers are demodulated by way of DPSK method. A number of parallel output signals from demodulator stage 14 corresponding to the number of carriers is then fed into a second parallel-to-serial-converter 15 to obtain a single serial signal comprising all the information of all carriers, that means of all users resp. channels. This serial signal is fed into a splitting means 16 for splitting up the information into the channels for the users connected to output lines 17 of splitting means 16. To each of the output lines 17 one user resp. channel is connected. Optionally, a decoding stage 18 is provided (for each of the users) for decoding the signals in case they are coded by coding means like coding stage 7.

As was discussed hereinbefore, IFFT means 10 and FFT means 13 have to perform a very large number of arithmetic operations. In case receiver stage 3 only has to provide the data resp. information signal related to one channel resp. user, a large portion of this number of operations can be saved according to the invention.

Figure 3:
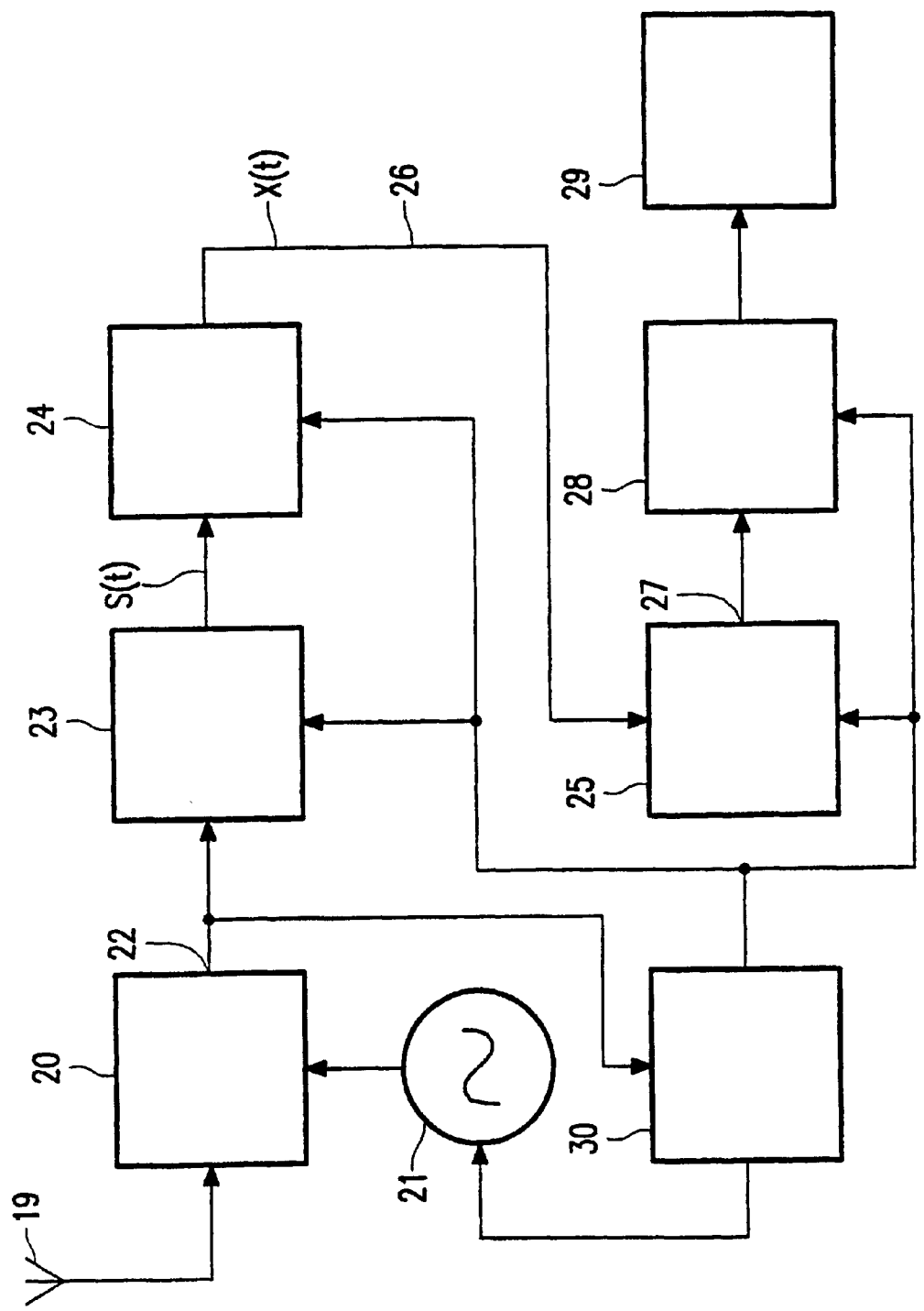
FIG. 3 is a schematic block diagram of a receiver stage for a transmission system according to the invention.

FIG. 3 shows an example of a receiver stage according to the invention. This receiver stage comprises an antenna 19 connected to a RF input of a down converter stage 20 converting the RF signals received via antenna 19 to IF. The conversion is done by mixing the RF signals with a local oscillator frequency obtained from a local oscillator, hereinafter denoted as LO 21. The down converted signals obtained from an output 22 of down converter 20 are of the form as shown in FIG. 1 with a set of carriers regularly spaced.

The circuit of FIG. 3 further comprises an analog-to-digital-converter, hereinafter denoted as ADC 23, in which samples S(t) are taken from the signal obtained from output 22. These samples S(t) are fed into a (digital) comb filter stage 24.

Comb filter stage 24 constitutes a comb filtering and decimation filter means according to the invention. Within comb filter stage 24 a (digital) output signal is derived from the samples S(t) by way of the above-mentioned equation $$X(t) = \sum_{n=1}^{n=N_r} S\left(t + n \cdot \frac{f_s}{f_{sep}}\right)$$

wherein t is an integer of a value running from t=1 to t=$f_s/f_{sep}$, n is an integer of a value running from n=1 to n=$N_r$, $N_r$ is defined as $N_r = f_{sep}/f_{sym}$, $f_s$ is the receiver sampling frequency, $f_{sym}$ is the symbol rate on a single carrier, $f_{sep}$ is the carrier separation and X(t) are the samples of the output signal as obtained by said processing.

Such the information of a determined number of carriers related to a chosen user resp. channel is filtered out of the entire signal and made available in form of samples X(t) at an output of comb filter stage 24 and thus on line 26 which is connected to this output.

These samples X(t) containing the information related to one user are fed via line 26 into a FFT stage 25 which is comparable to FFT means 13 depicted in FIG. 2. As known from the art, signals are transformed by FFT from the time domain into the frequency domain. Such, an information about the phases of the carriers related to the chosen user is given at an output 27 of FFT stage 25 in the frequency domain.

From output 27 of FFT stage 25 the signals are fed into a demodulation and decision stage 28 for demodulation (in digital form and in the frequency domain) and further evaluation, especially for suppression of fading. The evaluated signals are then led to an output stage 29.

The circuit shown in FIG. 3 further comprises a synchronization and control stage 30 being fed by the signal derived from output 22 of down converter 20. Thus, a control signal can be generated for controlling the oscillation frequency of LO 21, where down converter 20, synchronization and control stage 30 and LO 21 form a control loop. Synchronization and control stage 30 further leads control signals to ADC 23, comb filter stage 24, FFT stage 25 and demodulation and decision stage 28.

Comb filter stage 24 can be programmable to select and process a chosen part of the totality of modulated carriers transmitted via antenna 19. According to that, FFT stage 25 can also be programmable to determine the size of the FFT to be applied to the samples X(t). Such, a choice can be made whether to evaluate the information related to only one channel or to a number of channels up to the total number. By this way the minimum possible amount of processing is needed in all cases.

What is claimed is:

1. Transmission system for transmission of a signal comprising a number of carriers, each of which is represented by a sinusoid with a phase modulated by a data signal, the carriers forming a harmonically related set of signal components with a period equal to the reciprocal of a minimum frequency separation between each component, the baseband representation of said carriers being such that one of the carriers is positioned at zero frequency, wherein samples S(t) of the signal are processed in the following way:

$$X(t) = \sum_{n=1}^{n=N_r} S\left(t + n \cdot \frac{f_s}{f_{sep}}\right)$$

with t being an integer of a value running from t=1 to t=$f_s/f_{sep}$, n being an integer of a value running from n=1 to n=$N_r$ and $N_r$ being defined as $N_r=f_{sep}/f_{sym}$, where $f_s$ is the receiver sampling frequency, $f_{sym}$ is the symbol rate on a single carrier, $f_{sep}$ is the carrier separation and X(t) is the output signal as obtained by said processing.

2. Receiver stage for a transmission system as claimed in claim 1, comprising a comb filtering and decimation filter means, these comb filtering and decimation filter means forming from a totality of the samples S(t) of the signal an output signal X(t) for all carriers related to one data channel following the equation $$X(t) = \sum_{n=1}^{n=N_r} S\left(t + n \cdot \frac{f_s}{f_{sep}}\right)$$

followed by a FFT stage performing on the basis of said samples X(t) of the output signal a FFT of the size given by the number of said carriers related to one of said channels.

* * * * *